(12) United States Patent
Bu et al.

(10) Patent No.: US 11,126,867 B2
(45) Date of Patent: Sep. 21, 2021

(54) LANE DETECTION APPARATUS AND METHOD AND ELECTRONIC DEVICE

(71) Applicant: FUJITSU LIMITED, Kawasaki (JP)

(72) Inventors: Xiaoyan Bu, Beijing (CN); Zejing Han, Beijing (CN)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 16/887,401

(22) Filed: May 29, 2020

(65) Prior Publication Data

US 2020/0394422 A1 Dec. 17, 2020

(30) Foreign Application Priority Data

Jun. 14, 2019 (CN) .......................... 201910513841.5

(51) Int. Cl.
 *G06K 9/00* (2006.01)
 *G06K 9/38* (2006.01)
 *G06K 9/20* (2006.01)

(52) U.S. Cl.
 CPC ....... *G06K 9/00798* (2013.01); *G06K 9/2054* (2013.01); *G06K 9/38* (2013.01)

(58) Field of Classification Search
 None
 See application file for complete search history.

(56) References Cited

U.S. PATENT DOCUMENTS

| | | | |
|---|---|---|---|
| 2016/0048733 A1* | 2/2016 | Jung | G06K 9/00798 382/104 |
| 2019/0095722 A1* | 3/2019 | Kang | G06T 7/215 |
| 2019/0279003 A1* | 9/2019 | Guo | G06K 9/00798 |
| 2020/0074190 A1* | 3/2020 | Khakharia | G06T 7/77 |

* cited by examiner

*Primary Examiner* — Fayyaz Alam
(74) *Attorney, Agent, or Firm* — Staas & Halsey LLP (57) ABSTRACT

Embodiments of this disclosure provide a lane detection apparatus and method and an electronic device. First, pre-processing is performed based on semantic segmentation to remove interference objects in a binary image, which may improve accuracy of a lane line detection and may be applicable to various road scenarios, and the result based on semantic segmentation may automatically extract a lane line region image containing one or more lane lines, thereby automatically performing perspective transformation to perform search and fitting on the one or more lane lines, including achieving multi-lane detection. And furthermore, by synthesizing detection results of a plurality of input images, accuracy and integrity of the lane detection may further be improved.

10 Claims, 11 Drawing Sheets

LANE DETECTION APPARATUS AND METHOD AND ELECTRONIC DEVICE

CROSS-REFERENCE TO RELATED APPLICATIONS

This application claims priority under 35 USC 119 to Chinese patent application no. 201910513841.5, filed on Jun. 14, 2019, in the China National Intellectual Property Administration, the entire contents of which are incorporated herein by reference.

TECHNICAL FIELD

This disclosure relates to the field of information technologies.

BACKGROUND

Lane detection is a very important and challengeous task in traffic video surveillance and autonomous driving. Lane detection is generally performed by detecting lane lines, which is subjected to many factors. For example, vehicles moving on lanes, green belts between the lanes and accuracy of extracting lane regions may lead to inaccurate lane line detection results.

In order to detect lane lines, one of the commonly used methods is based on Hough transformation. In this method, an original image is preprocessed first to obtain a binary image, and then a target lane region is manually extracted to detect lane lines via Hough transformation. And finally, the left and right lane lines are distinguished by determining whether a slope of the lane lines is positive or negative.

In addition, a method based on sliding window search has been proposed to detect lane lines. In this method, a perspective transformation region is manually set first, and the original image is transformed into an overhead view through perspective transformation, then a sliding window is used to search for pixels of the lane lines and fit lane curves, and finally, the overhead view is reversely transformed back to the original angle.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that in the existing methods described above, in the method based on Hough transformation, manual extraction of the target lane region from the image is needed. In addition, the method distinguishes left and right lane lines by determining whether the slope of the lane lines is positive or negative. Thus, this method is only applicable to detecting a single lane. Furthermore, the accuracy of lane line detection is subjected to interference of interference objects, such as moving vehicles, and green belts.

As to the above search method based on a sliding window, it is limited by the need for manually setting a perspective transformation region, so that the method is unable to be adapted for different road scenes. In addition, this method is unable to determine the number and positions of the lane lines, only applicable to detecting single lane lines, and is only able to search lane lines on the left and right half of the overhead view, respectively.

Embodiments of this disclosure provide a lane detection apparatus and method and an electronic device. First, preprocessing is performed based on semantic segmentation to remove interference objects in a binary image, which may improve accuracy of the lane detection and may be applicable to various road scenarios, and the result based on semantic segmentation may automatically extract a lane region image containing all the lanes, thereby automatically performing perspective transformation to perform search and fitting on the lanes and achieving multi-lane detection. And furthermore, by synthesizing detection results of a plurality of input images, accuracy and integrity of the lane detection may further be improved.

According to a first aspect of the embodiments of this disclosure, there is provided a lane detection apparatus, the apparatus including: a detecting unit configured to respectively detect a plurality of input images to obtain lane detection results of the input images; and a synthesizing unit configured to obtain a synthetical lane detection result according to the lane detection results of the input images; wherein the detecting unit includes: a segmenting unit configured to determine regions of objects of various types in an input image based on semantic segmentation; a preprocessing unit configured to remove interference objects in a binary image of the input image according to the regions of objects of various types in the input image to obtain a preprocessed binary image; an extracting unit configured to extract a lane region image from the preprocessed binary image according to the regions of objects of various types in the input image; a transforming unit configured to perform perspective transformation on an extracted lane region image to obtain an overhead-view image; a searching unit configured to perform lane line search and fitting on the overhead-view image to determine lane lines in the overhead-view image; and an inverse transforming unit configured to perform perspective inverse transformation on the overhead-view image with lane lines being determined, and determine lane lines of the input image according to a result of the perspective inverse transformation to obtain the lane detection results of the input image.

According to a second aspect of the embodiments of this disclosure, there is provided an electronic device, including the apparatus as described in the first aspect of the embodiments of this disclosure.

According to a third aspect of the embodiments of this disclosure, there is provided a lane detection method, the method including: respectively detecting a plurality of input images to obtain lane detection results of the input images; and obtaining a synthetical lane detection result according to the lane detection results of the input images; wherein detecting one of the input images includes: determining regions of objects of various types in the input image based on semantic segmentation; removing interference objects in a binary image of the input image according to the regions of objects of various types in the input image, to obtain a preprocessed binary image; extracting a lane region image from the preprocessed binary image according to the regions of objects of various types in the input image; performing perspective transformation on an extracted lane region image to obtain an overhead-view image; performing lane line search and fitting on the overhead-view image, to determine lane lines in the overhead-view image; and performing perspective inverse transformation on the overhead-view image with lane lines being determined, and determine lane lines of the input images according to a result of the perspective inverse transformation, to obtain the lane detection result of the input image.

An advantage of the embodiments of this disclosure exists in that first, preprocessing is performed based on semantic segmentation to remove interference objects in a binary image, which may improve accuracy of the lane detection and may be applicable to various road scenarios, and the result based on semantic segmentation may automatically extract a lane region image containing all the lanes, thereby automatically performing perspective transformation to perform search and fitting on the lanes and achieving multi-lane detection. And furthermore, by synthesizing detection results of a plurality of input images, accuracy and integrity of the lane detection may further be improved.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

First Embodiment

Figure 1:
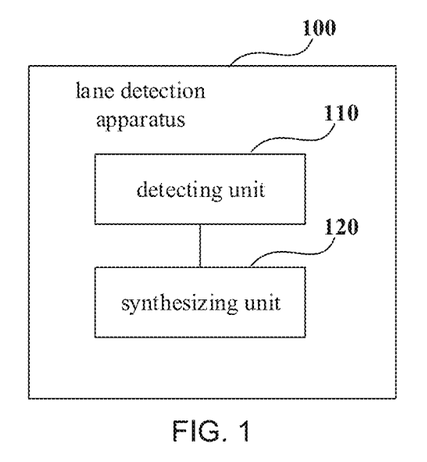
FIG. 1 is a schematic diagram of the lane detection apparatus of the first Embodiment of this disclosure.
Figure 2:
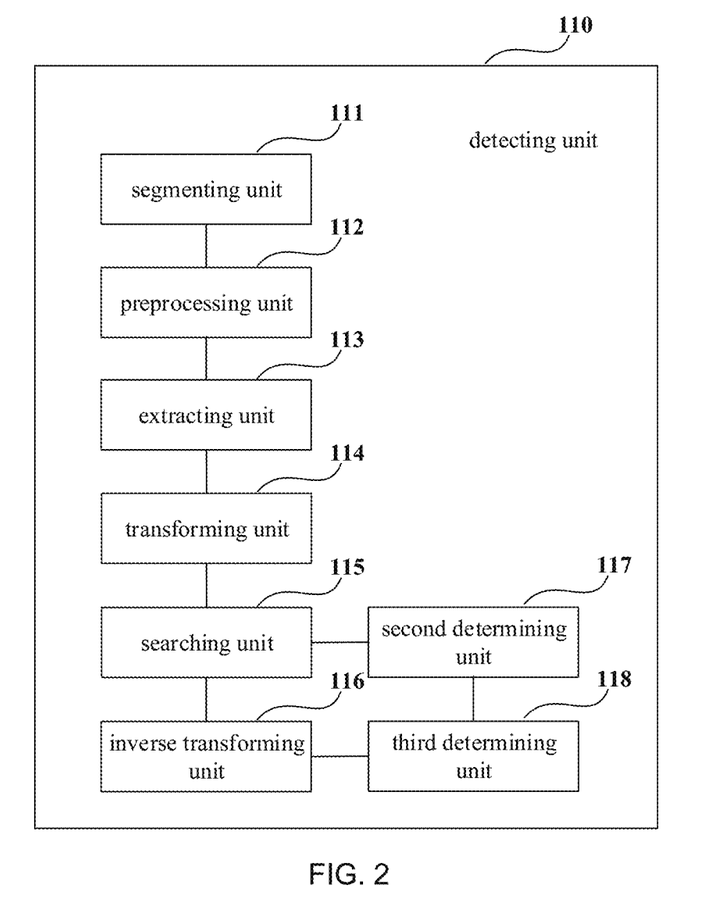
FIG. 2 is a schematic diagram of the detecting unit 102 of the first Embodiment of this disclosure.

The embodiment of this disclosure provides a lane detection apparatus. FIG. 1 is a schematic diagram of the lane detection apparatus of the first Embodiment of this disclosure, and FIG. 2 is a schematic diagram of the detecting unit 102 of the first Embodiment of this disclosure. As shown in FIGS. 1 and 2, a lane detection apparatus 100 includes:

a detecting unit 110 configured to respectively detect a plurality of input images to obtain lane detection results of the input images; and a synthesizing unit 120 configured to obtain a synthetical lane detection result according to the lane detection results of the input images;

wherein the detecting unit 110 includes:

a segmenting unit 111 configured to determine regions of objects of various types in an input image based on semantic segmentation;

a preprocessing unit 112 configured to remove interference objects in a binary image of the input image according to the regions of objects of various types in the input image to obtain a preprocessed binary image;

an extracting unit 113 configured to extract a lane region image from the preprocessed binary image according to the regions of objects of various types in the input image;

a transforming unit 114 configured to perform perspective transformation on an extracted lane region image to obtain an overhead-view image;

a searching unit 115 configured to perform lane line search and fitting on the overhead-view image to determine lane lines in the overhead-view image; and an inverse transforming unit 116 configured to perform perspective inverse transformation on the overhead-view image with lane lines being determined, and determine lane lines of the input image according to a result of the perspective inverse transformation to obtain the lane detection results of the input image.

It can be seen from the above embodiment that first, preprocessing is performed based on semantic segmentation to remove interference objects in a binary image, which may improve accuracy of the lane detection and may be applicable to various road scenarios, and the result based on semantic segmentation may automatically extract a lane region image containing all the lanes, thereby automatically performing perspective transformation to perform search and fitting on the lanes and achieving multi-lane detection. And furthermore, by synthesizing detection results of a plurality of input images, accuracy and integrity of the lane detection may further be improved.

In this embodiment, the detecting unit 110 respectively detects the plurality of input images to obtain lane detection results of the input image. In this embodiment, for example, the plurality of input images are a plurality of consecutive frames in a surveillance video capturing the same scene, or a plurality of frames at intervals in the surveillance video.

In this embodiment, the number of the plurality of input images may be set as actually demanded.

In this embodiment, the detecting unit 110 respectively detects each input image in the input images, and an order of detection is not limited herein.

Detection methods of the detecting unit 110 for each input image are identical. Hereinafter, a method of the detecting unit 110 for detecting one of the plurality of input shall be described below.

As shown in FIG. 2, the segmenting unit 111 determines regions of objects of various types in the input image based on semantic segmentation.

In this embodiment, an existing method, such as semantic segmentation based on DeepLab V3, may be used by the segmenting unit 111 in performing the semantic segmentation.

Figure 3:
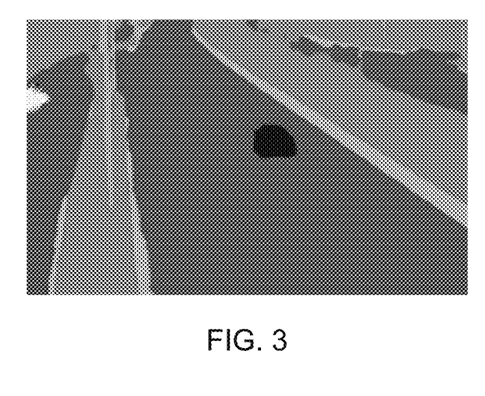
FIG. 3 is a schematic diagram of the input image after being performed semantic segmentation of the first Embodiment of this disclosure.

FIG. 3 is a schematic diagram of the input image after being performed semantic segmentation of the first Embodiment of this disclosure. As shown in FIG. 3, after the semantic segmentation, objects of different types in the input image are denoted by different colors, thereby determining regions where the objects of the types are located. In this way, regions of interference objects are located, such as moving vehicles on the lanes, and green belts between roads, may be determined.

In this embodiment, the preprocessing unit 112 removes the interference objects in the binary image of the input image according to the segmentation result of the segmenting unit 111 performed on the input image, that is, according to the regions of the objects of the types in the input image, and obtains the preprocessed binary image.

Figure 4:
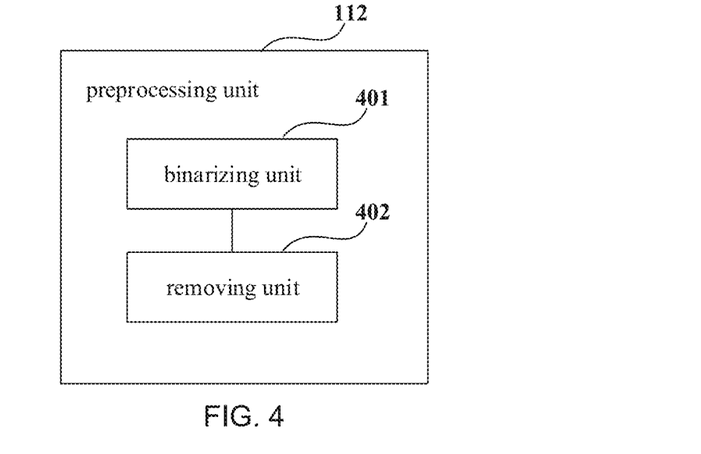
FIG. 4 is a schematic diagram of the preprocessing unit 112 of The first Embodiment of this disclosure.

FIG. 4 is a schematic diagram of the preprocessing unit 112 of the first Embodiment of this disclosure. As shown in FIG. 4, the preprocessing unit 112 includes:

a binarizing unit 401 configured to obtain the binary image of the input image; and a removing unit 402 configured to remove interference objects from the binary image according to the regions where the interference objects in objects of various types are located, to obtain the preprocessed binary image.

In this embodiment, the binarizing unit 401 may obtain the binary image in an existing method.

Figure 5:
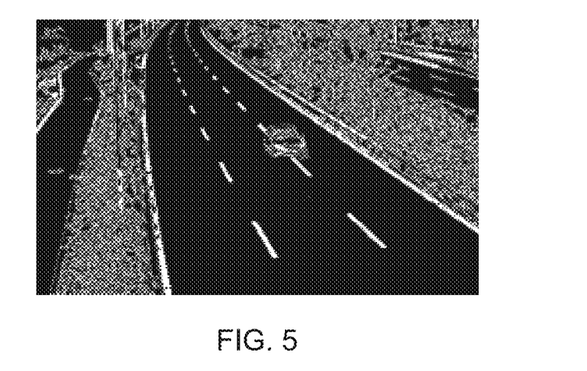
FIG. 5 is a binary image of the input image of the first Embodiment of this disclosure.

FIG. 5 is the binary image of the input image of the first Embodiment of this disclosure. As shown in FIG. 5, pixel values of objects, such as lane lines, vehicles, and green belts, etc., are set to be "1", and pixel values of objects, such as lanes between the lane lines, are set to be "0".

The removing unit 402 removes the interfering object from the binary image according to the segmentation result of the segmenting unit 111 performed on the input image, that is, according to the regions of the interference objects in the objects of the types, to obtain the preprocessed binarized image.

Figure 6:
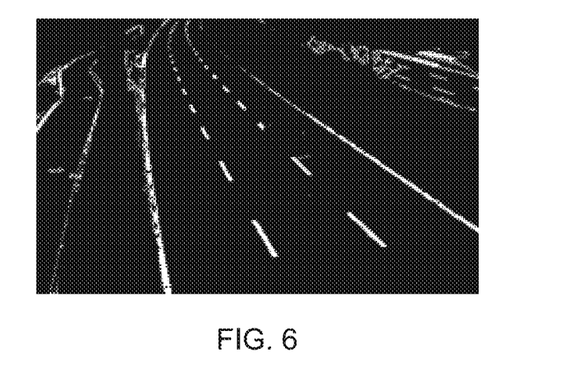
FIG. 6 is the preprocessed binary image of the first Embodiment of this disclosure.

FIG. 6 is the preprocessed binary image of the first Embodiment of this disclosure. The interference objects are removed from the binary image shown in FIG. 5 according to the regions where the interference objects are located determined in FIG. 3, such as vehicles moving on the lane, and the green belts between the roads, etc., that is, setting the pixel values of these objects to be "0", to obtain the preprocessed binary image shown in FIG. 6.

In this embodiment, types of objects included in the interference objects needing to be removed may be determined according to an actual application scenario, as long as objects that may affect the detection of the lane lines may be used as the interference objects. In this embodiment, the interference objects include, for example, a vehicle moving on a lane, a green belt between roads, and a street lamp.

In this embodiment, the extracting unit 113 extracts the lane region image from the preprocessed binary image according to the segmentation result of the segmenting unit 111 performed on the input image, that is, according to the regions of the objects of the types in the input image.

In this embodiment, a shape of the extracted lane region image may be determined according to a requirement of the transforming unit 114 in performing the perspective transformation, for example, the extracted lane region image is of a trapezoidal shape.

Figure 7:
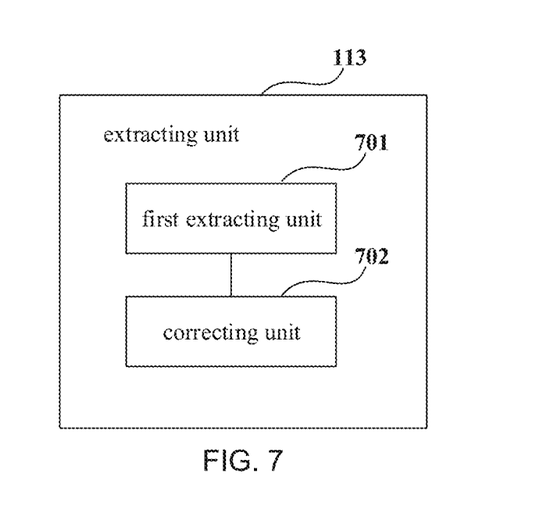
FIG. 7 is a schematic diagram of the extracting unit 113 of the first Embodiment of this disclosure.

FIG. 7 is a schematic diagram of the extracting unit 113 of the first Embodiment of this disclosure. As shown in FIG. 7, the extracting unit 113 includes:

a first extracting unit 701 configured to extract images of regions where lane lines in the preprocessed binary image are located according to regions where lane lines in the objects of various types are located; and a correcting unit 702 configured to correct the image of the regions where the lane lines are located to obtain the lane region image.

Figure 8:
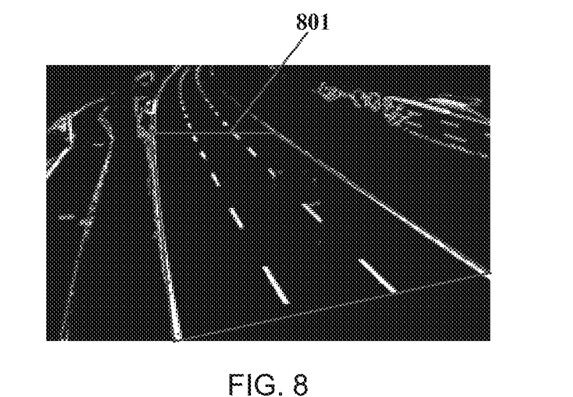
FIG. 8 is a schematic diagram of extracting regions where the lanes are located of the first Embodiment of this disclosure.

FIG. 8 is a schematic diagram of extracting regions where the lanes are located of the first Embodiment of this disclosure. As shown in FIG. 8, according to the road regions determined in FIG. 3, the first extracting unit 701 determines an image of the region where the lane is located from the binary image shown in FIG. 6, that is, a portion shown by frame 801.

Figure 9:
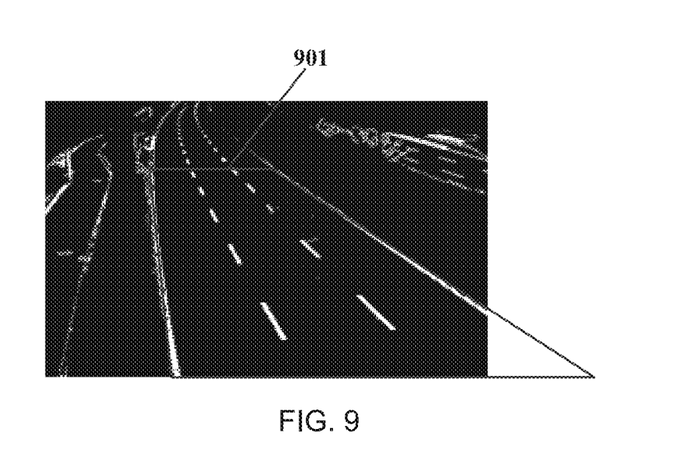
FIG. 9 is a schematic diagram of the lane region image obtained after being corrected of the first Embodiment of this disclosure.

The correcting unit 702 corrects the image of the region where the lane is located extracted by the first extracting unit 701, such as expanding the shape of the extracted image and supplementing it into a complete trapezoidal shape. FIG. 9 is a schematic diagram of the lane region image obtained after being corrected of the first Embodiment of this disclosure. As shown in FIG. 9, the portion shown by frame 801 in FIG. 8 is expanded and extended to obtain a complete trapezoidal region 901, and an image of the trapezoidal region 901 is the lane region image obtained after correction.

After the extracting unit 113 extracts the lane region image, the transforming unit 114 performs perspective transformation on the extracted lane region image to obtain the overhead-view image.

In this embodiment, the transforming unit 114 may perform the perspective transformation in an existing method.

For example, the perspective transformation may be performed according to the following formulae (1) and (2):

$$[x', y', w'] = [u, v, w] \cdot T, \quad (1)$$

$$T = \begin{bmatrix} a_{11} & a_{12} & a_{13} \\ a_{21} & a_{22} & a_{23} \\ a_{31} & a_{32} & a_{33} \end{bmatrix}; \quad (2)$$

where, (u, v) is coordinates of pixels in the lane region image, (x=x'/w', y=y'/w') is the coordinates of the pixels in the overhead image, w' and w are coordinate transformation coefficients, T is a perspective transformation matrix, and $a_{11}, \ldots, a_{33}$ are elements of the perspective transformation matrix.

Figure 10:
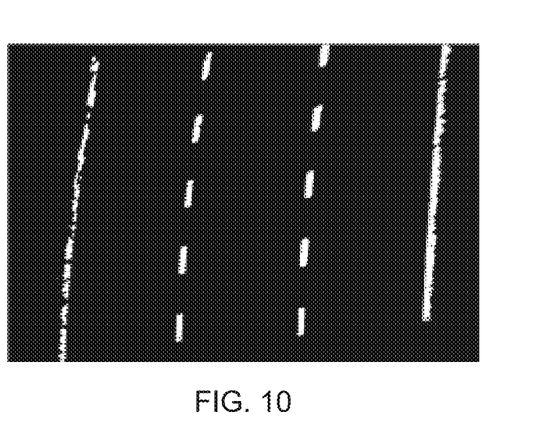
FIG. 10 is an overhead-view image after perspective transformation of the first Embodiment of this disclosure.

FIG. 10 is an overhead-view image after perspective transformation of the first Embodiment of this disclosure. After perspective transformation is performed on the image of the trapezoidal region 901 in FIG. 9, the overhead-view image shown in FIG. 10 is obtained.

After obtaining the overhead-view image by the transforming unit 114, the searching unit 115 performs lane line searches and fitting on the overhead-view image to determine the lane lines in the overhead-view image. A structure of the searching unit 115 and a search method shall be described below by way of examples.

Figure 11:
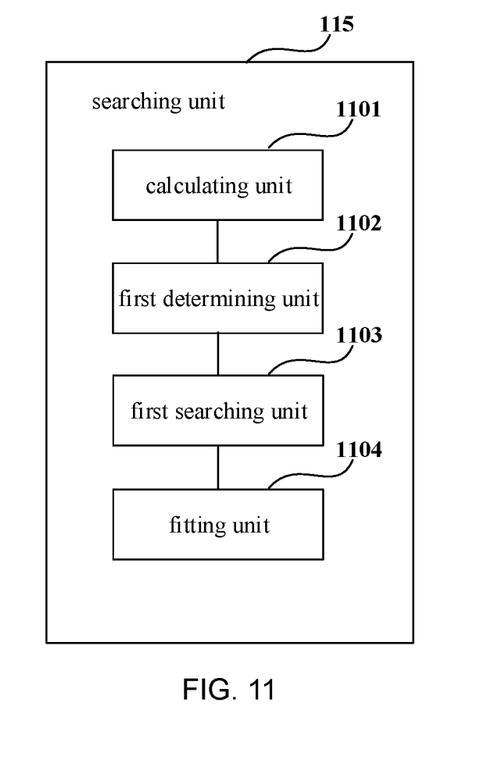
FIG. 11 is a schematic diagram of the searching unit 115 of the first Embodiment of this disclosure.

FIG. 11 is a schematic diagram of the searching unit 115 of the first Embodiment of this disclosure. As shown in FIG. 11, the searching unit 115 includes:

a calculating unit 1101 configured to calculate a histogram of accumulated pixel values in the overhead-view image;

a first determining unit 1102 configured to determine the number of lane lines in the overhead-view image according to the number of waveforms in the histogram;

a first searching unit 1103 configured to search the lane lines in the overhead-view image by using a sliding window, and detect pixels of non-zero values; and a fitting unit 1104 configured to fit the detected pixels of non-zero values to determine the lane lines in the overhead-view image.

Figure 12:
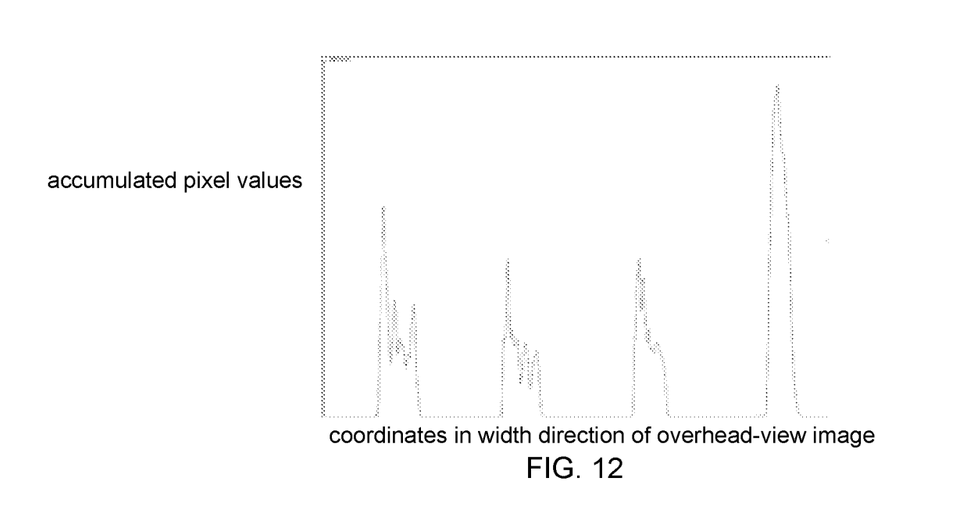
FIG. 12 is a histogram of the accumulated pixel values in the overhead-view image of the first Embodiment of this disclosure.

In this embodiment, the calculating unit 1101 calculates the histogram of the accumulated pixel values of the overhead-view image. FIG. 12 is the histogram of the accumulated pixel values in the overhead-view image of the first Embodiment of this disclosure. As shown in FIG. 12, the abscissa denotes coordinates in a width direction of the overhead-view image, and the ordinate denotes the accumulated pixel values.

The first determining unit 1102 determines the number of lane lines in the overhead-view image according to the number of waveforms in the histogram, that is, the number of waveforms in the histogram corresponds to the number of lane lines in the overhead-view image. In addition, waveforms with amplitudes less than a preset threshold may be removed, so as to remove interference of noises.

For example, as shown in FIG. 12, when there are four waveforms in the histogram, it indicates that the number of lane lines in the overhead-view image is four.

The first searching unit 1103 searches the lane lines in the overhead-view image by using the sliding window to detect the pixels of non-zero values.

In this embodiment, the first searching unit 1103 respectively searches the lane lines, and search processes for searching the lane lines may be performed in parallel or one by one, and a search sequence of the lane lines is not limited in the embodiment of this disclosure. A method for searching a lane line by the first searching unit 1103 shall be illustrated below.

For example, in searching for a lane line, the first searching unit 1103 first determines a starting point of the search, such as taking a pixel point of the histogram corresponding to a peak value of a waveform of the lane line as the starting point, then, moves the sliding window up and down to perform grid search, to determine all pixel points of non-zero values in a searched region. For example, an average coordinate of all pixel points of non-zero values detected in the sliding window are taken as a starting point of a next sliding window to be moved.

In this embodiment, a size of the sliding window may be determined according to an actual situation. For example, a width of the sliding window is a predetermined proportion of a width of the overhead-view image, such as ⅒, and a height of the sliding window is a height of the overhead-view image divided by the number of times of movement of the sliding window.

The fitting unit 1104 performs fitting on the pixels of non-zero values detected by the first searching unit 1103 to determine the lane lines in the overhead-view image.

For example, the fitting unit 1104 performs fitting on all pixels of non-zero values detected on the lane line by using a second-order polynomial to obtain parameters of fitted curves of the lane line, thereby determining a shape of the lane line.

Figure 13:
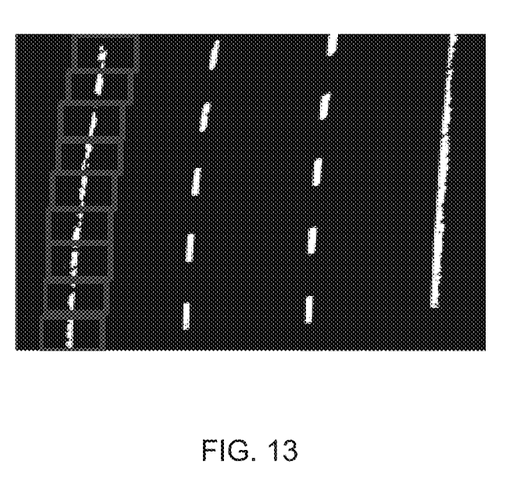
FIG. 13 is a schematic diagram of searching by using a sliding window of the first Embodiment of this disclosure.

FIG. 13 is a schematic diagram of searching by using a sliding window of the first Embodiment of this disclosure. As shown in FIG. 13, taking the first lane line on the left as an example, a sliding window is used to search from the bottom to the top to detect pixels of non-zero values. In addition, the plurality of sliding windows in FIG. 13 actually denote a movement process of a sliding window.

In this embodiment, the searching unit 115 determines the shapes and positions of the lane lines in the overhead-view image via the detected pixels of non-zero values. In addition, according to the lane lines determined by the searching unit 115, types of the lane lines may also be determined.

For example, as shown in FIG. 2, the detecting unit 110 may further include:

a second determining unit 117 configured to determine lengths of line segments and/or lengths of intervals between the line segments according to determined lane lines in the overhead-view image; and a third determining unit 118 configured to determine types of the lane lines according to the lengths of line segments and/or the lengths of intervals between the line segments in the lane lines.

In this embodiment, the types of the lane lines are, for example, solid lines and dotted lines.

In this way, the types of the lane lines may be detected, hence, solid lines and dotted lines may be distinguished.

In this embodiment, the second determining unit 117 determines the lengths of the line segments and/or the lengths of intervals between the line segments according to the determined lane lines in the overhead-view image.

For example, the searching unit 115 determines the lane lines in the overhead-view image via the detected pixels of non-zero values, then continuous pixels of non-zero values constitute a line segment, hence, the lengths of the line segments may be determined. And furthermore, the lengths of the intervals between adjacent line segments may also be determined.

The third determining unit 118 determines the types of the lane lines according to the lengths of the line segments and/or the lengths of the intervals between the line segments in the lane lines. For example, the third determining unit determines the lane lines as solid lines when the lengths of line segments and/or the lengths of intervals between the line segments satisfy at least one of the following conditions, otherwise, determines the lane lines as dotted lines: a ratio of a longest line segment to a shortest line segment in the lane lines being greater than a first threshold L1; a length of the longest line segment in the lane lines being less than a second threshold L2; and an average value of all the intervals between the line segments in the lane lines being less than a third threshold L3.

In this embodiment, particular values of the first threshold L1, the second threshold L2 and the third threshold L3 may be set as actually demanded.

Figure 14:
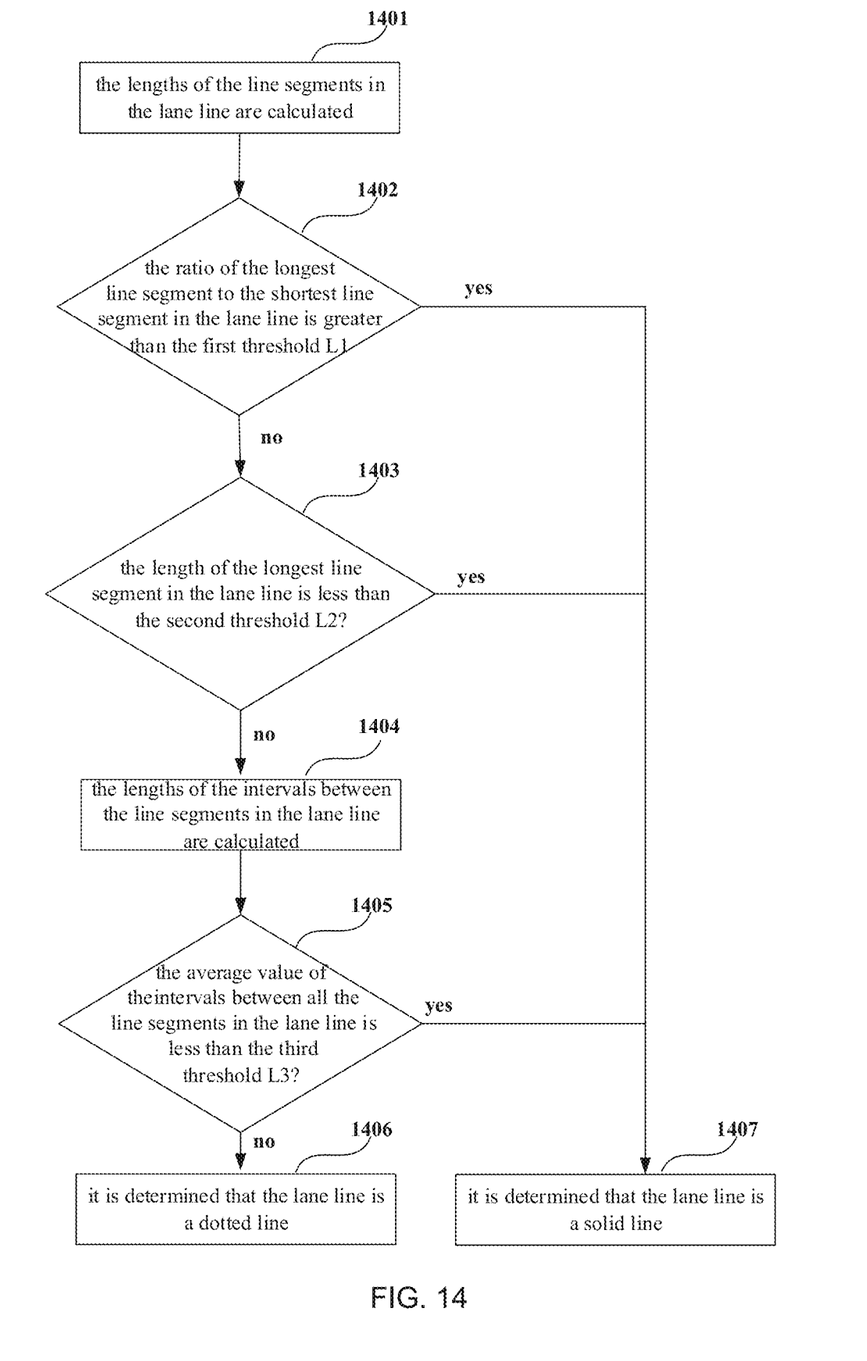
FIG. 14 is a flowchart of a method for determining a type of a lane line of the first Embodiment of this disclosure.

FIG. 14 is a flowchart of a method for determining a type of a lane line of the first Embodiment of this disclosure. As shown in FIG. 14, the method includes:

Step 1401: the lengths of the line segments in the lane line are calculated;

Step 1402: it is determined whether the ratio of the longest line segment to the shortest line segment in the lane line is greater than the first threshold L1, proceeding to step 1407 when the determination result is "yes", and proceeding to step 1403 when the determination result is "no";

Step 1403: it is determined whether the length of the longest line segment in the lane line is less than the second threshold L2, proceeding to step 1407 when the determination result is "yes", and proceeding to step 1404 when the determination result is "no";

Step 1404: the lengths of the intervals between the line segments in the lane line are calculated;

Step 1405: it is determined whether the average value of the intervals between all the line segments in the lane line is less than the third threshold L3, proceeding to step 1407 when the determination result is "yes", and proceeding to step 1406 when the determination result is "no";

Step 1406: it is determined that the lane line is a dotted line; and

Step 1407: it is determined that the lane line is a solid line.

In this embodiment, after the searching unit 115 determines the positions and types of the lane lines in the overhead-view image, corresponding lanes line may be marked according to the positions and types of the lane lines. Then, the inverse transforming unit 116 performs perspective inverse transformation on the overhead-view image with lane lines being determined, and determines the lane lines of the input image according to the result of the perspective inverse transformation to obtain the lane detection results of the input image.

The inverse transforming unit 116 may perform inverse perspective transform on the overhead-view image in an existing method.

For example, the inverse perspective transformation is performed on the overhead-view image according to formula (3) as below:

$$[u,v,w]=[x',y',w']\cdot T^{-1} \quad (3);$$

where, (u, v) are coordinates of pixels in the image after perspective inverse transformation, (x=x'/w', y=y'/w') are coordinates of pixels in the overhead-view image, w' and w are coordinate transformation coefficients, and $T^{-1}$ is an inverse matrix of the perspective transformation matrix T.

After the inverse perspective transformation is performed on the overhead-view image, the image after the inverse perspective transformation may be superimposed on the input image to obtain the lane detection result of the input image, such as an input image with lane lines being marked.

Figure 15:
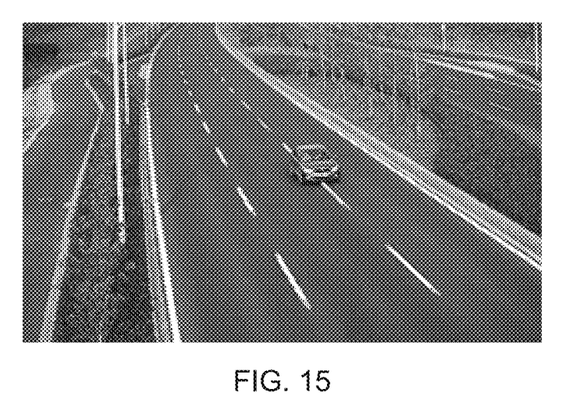
FIG. 15 is a schematic diagram of the lane detection result of the first Embodiment of this disclosure.

FIG. 15 is a schematic diagram of the lane detection result of the first Embodiment of this disclosure. As shown in FIG. 15, the lane lines in the input image are marked according to the types thereof.

In this embodiment, the lane detection is achieved by detecting the lane lines, and two adjacent lane lines constitute a lane.

A process of detecting an input image in a plurality of input images by the detecting unit 110 is described above. And for the plurality of input images, the above detection may be performed respectively to obtain lane detection results of the input images; thereafter, the synthesizing unit 120 obtains the synthetical lane detection result according the lane detection results of the input images.

For example, the synthesizing unit 120 synthesizes detection results of lanes of the input images where all number of lanes are detected, to obtain the synthetical lane detection result.

For example, the plurality of input images are total of eight input images, which are input image 1, input image 2, ..., and input image 8, respectively. For example, four lane lines are detected in input images 1, 3, 4, 6, 7, 8, and three lane lines are detected in input images 2 and 5. Then, lane detection results of the input images 2 and 5 are removed, that is, lane detection results of input images in which all detectable number of lane lines are detected are reserved.

In this embodiment, the synthesizing unit 120 may superimpose pixels of non-zero values on the lane lines in the input images where all the number of lane lines are detected to obtain superimposed lane lines, that is, the synthetical detection result.

In addition, in a case where the types of the lane line are determined, the synthesizing unit 120 may determine the types of the lane lines according to proportions of the respectively determined types of the lane lines in the same lane line in the input images.

For example, in input images 1, 3, 4, 6, 7, 8 in which all the number of lane lines are detected, detection results of input images 1, 3, 6, 7, 8 are solid lines for the leftmost lane line, and a detection result of input image 4 is a dotted line. Hence, a ratio of the lane lines that are detected as solid lines is 5/6, which exceeds a preset threshold 0.5, thereby synthetically determining the lane lines as a solid line.

It can be seen from the above embodiment that first, preprocessing is performed based on semantic segmentation to remove interference objects in a binary image, which may improve accuracy of the lane detection and may be applicable to various road scenarios, and the result based on semantic segmentation may automatically extract a lane region image containing all the lanes, thereby automatically performing perspective transformation to perform search and fitting on the lanes and achieving multi-lane detection. And furthermore, by synthesizing detection results of a plurality of input images, accuracy and integrity of the lane detection may further be improved.

Second Embodiment

Figure 16:
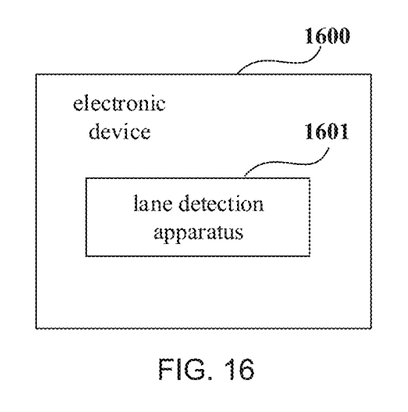
FIG. 16 is a schematic diagram of the electronic device of the second Embodiment of this disclosure.

The embodiment of this disclosure provides an electronic device. FIG. 16 is a schematic diagram of the electronic device of the second Embodiment of this disclosure. As shown in FIG. 16, an electronic device 1600 includes a lane detection apparatus 1601, a structure and functions of which being identical to those described in the first Embodiment, which shall not be described herein any further.

Figure 17:
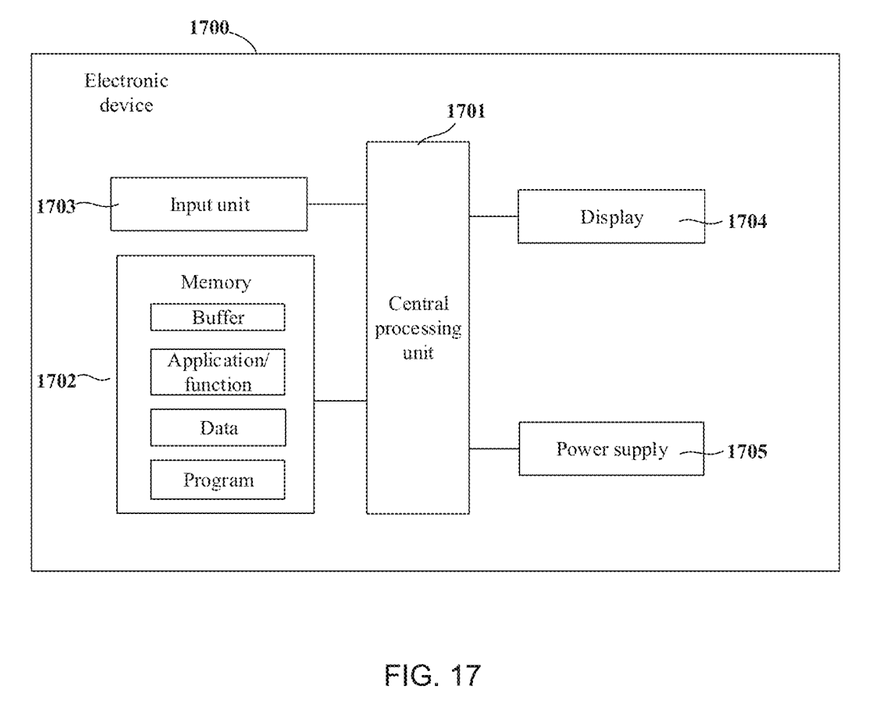
FIG. 17 is a block diagram of a systematic structure of the electronic device of the second Embodiment of this disclosure.

FIG. 17 is a block diagram of a systematic structure of the electronic device of the second Embodiment of this disclosure. As shown in FIG. 17, an electronic device 1700 may include a central processing unit 1701 and a memory 1702, the memory 1702 being coupled to the central processing unit 1701. This figure is illustrative only, and other types of structures may also be used, so as to supplement or replace this structure and achieve a telecommunications function or other functions.

As shown in FIG. 17, the electronic device 1700 may include an input unit 1703, a display 1704, and a power supply 1705.

In one implementation, the functions of the lane detection apparatus described in the first Embodiment may be integrated into the central processing unit 1701. The central processing unit 1701 may be configured to: respectively detect a plurality of input images to obtain lane detection results of the input images; and obtain a synthetical lane detection result according to the lane detection results of the input images; wherein, detecting one of the input images includes: determining regions of objects of various types in the input image based on semantic segmentation; removing interference objects in a binary image of the input image according to the regions of objects of various types in the input image, to obtain a preprocessed binary image; extracting a lane region image from the preprocessed binary image according to the regions of objects of various types in the input image; performing perspective transformation on an extracted lane region image to obtain an overhead-view image; performing lane line search and fitting on the overhead-view image, to determine lane lines in the overhead-view image; and performing perspective inverse transformation on the overhead-view image with lane lines being determined, and determine lane lines of the input images according to a result of the perspective inverse transformation, to obtain the lane detection result of the input image.

For example, the extracting a lane region image from the preprocessed binary image according to the regions of objects of various types in the input image includes: extracting images of regions where lane lines in the preprocessed binary image are located according to regions where lane lines in the objects of various types are located; and correcting the image of the regions where the lane lines are located to obtain the lane region image.

For example, the performing lane line search and fitting on the overhead-view image, to determine lane lines in the overhead-view image, includes: calculating a histogram of accumulated pixel values in the overhead-view image; determining the number of lane lines in the overhead-view image according to the number of waveforms in the histogram; searching the lane lines in the overhead-view image by using a sliding window, and detect pixels of non-zero values; and fitting the detected pixels of non-zero values to determine the lane lines in the overhead-view image.

For example, the detecting one of the input images further includes: determining lengths of line segments and/or lengths of intervals between the line segments according to determined lane lines in the overhead-view image; and determining types of the lane lines according to the lengths of line segments and/or the lengths of intervals between the line segments in the lane lines.

For example, the determining types of the lane lines according to the lengths of line segments and/or the lengths of intervals between the line segments in the lane lines includes: determining the lane lines as solid lines when the lengths of line segments and/or the lengths of intervals between the line segments satisfy at least one of the following conditions, otherwise, determining the lane lines as dotted lines: a ratio of a longest line segment to a shortest line segment in the lane lines being greater than a first threshold; a length of the longest line segment in the lane lines being less than a second threshold; and an average value of all the intervals between the line segments in the lane lines being less than a third threshold.

For example, the obtaining a synthetical lane detection result according to the lane detection results of the input images includes: synthesizing detection results of lanes of the input images where all number of lanes are detected, to obtain the synthetical lane detection result.

For example, the synthesizing detection results of lanes of the input images where all number of lanes are detected, to obtain the synthetical lane detection result, includes: determining a type of a lane according to proportions of types of the lane respectively determined in the input images.

In another implementation, the lane detection apparatus described in the first Embodiment and the central processing unit 1701 may be configured separately; for example, the lane detection apparatus may be configured as a chip connected to the central processing unit 1701, and the functions of the lane detection apparatus are executed under control of the central processing unit 1701.

In this embodiment, the electronic device 1700 does not necessarily include all the components shown in FIG. 17.

As shown in FIG. 17, the central processing unit 1701 is sometimes referred to as a controller or control, which may include a microprocessor or other processor devices and/or logic devices, and the central processing unit 1701 receives input and controls operations of every component of the electronic device 1700.

The memory 1702 may be, for example, one or more of a buffer memory, a flash memory, a hard drive, a mobile medium, a volatile memory, a nonvolatile memory, or other suitable devices, which may store the information on configuration, etc., and furthermore, store programs executing related information. And the central processing unit 1701 may execute programs stored in the memory 1702, so as to realize information storage or processing, etc. Functions of other parts are similar to those of the related art, which shall not be described herein any further. The parts of the terminal device, or the electronic device 1700 may be realized by specific hardware, firmware, software, or any combination thereof, without departing from the scope of this disclosure.

It can be seen from the above embodiment that first, preprocessing is performed based on semantic segmentation to remove interference objects in a binary image, which may improve accuracy of the lane detection and may be applicable to various road scenarios, and the result based on semantic segmentation may automatically extract a lane region image containing all the lanes, thereby automatically performing perspective transformation to perform search and fitting on the lanes and achieving multi-lane detection.

And furthermore, by synthesizing detection results of a plurality of input images, accuracy and integrity of the lane detection may further be improved.

Third Embodiment

Figure 18:
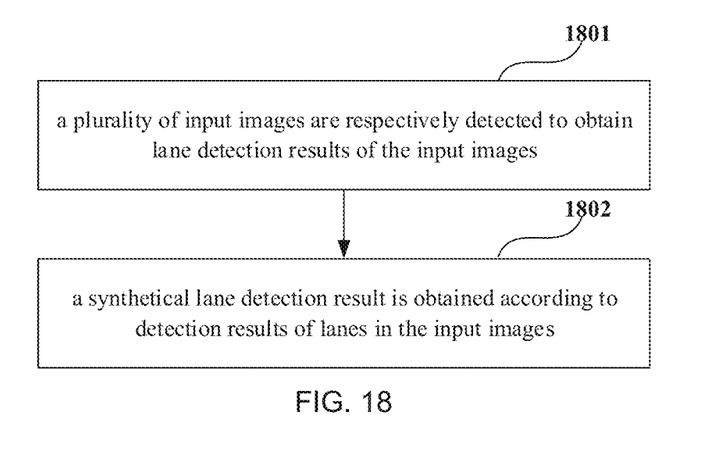
FIG. 18 is a flowchart of the lane detection method of the third Embodiment of this disclosure.

The embodiment of this disclosure provides a lane detection method, corresponding to the lane detection apparatus described in the first Embodiment. FIG. 18 is a flowchart of the lane detection method of the third Embodiment of this disclosure. As shown in FIG. 18, the method includes:

Step 1801: a plurality of input images are respectively detected to obtain lane detection results of the input images; and Step 1802: a synthetical lane detection result is obtained according to detection results of lanes in the input images.

Figure 19:
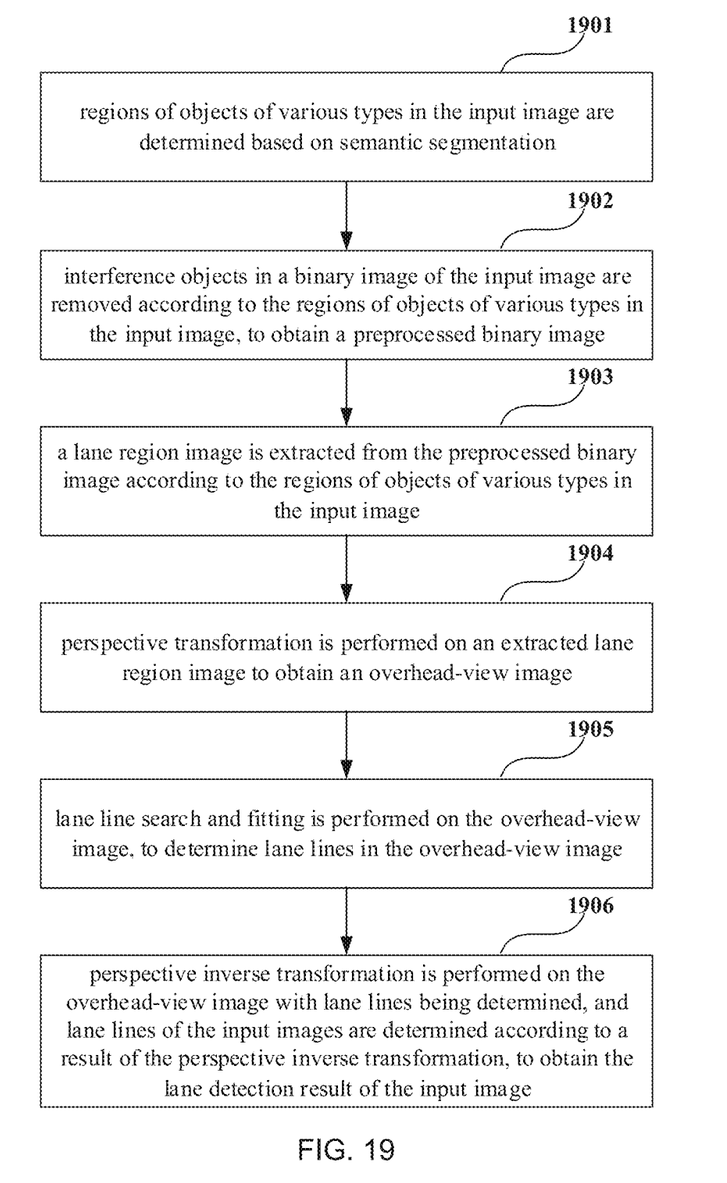
FIG. 19 is a flowchart of a method for detecting an image in a plurality of images in step 1801 of the third Embodiment of this disclosure.

FIG. 19 is a flowchart of a method for detecting an image in a plurality of images in step 1801 of the third Embodiment of this disclosure. As shown in FIG. 19, the method includes:

Step 1901: regions of objects of various types in the input image are determined based on semantic segmentation;

Step 1902: interference objects in a binary image of the input image are removed according to the regions of objects of various types in the input image, to obtain a preprocessed binary image;

Step 1903: a lane region image is extracted from the preprocessed binary image according to the regions of objects of various types in the input image;

Step 1904: perspective transformation is performed on an extracted lane region image to obtain an overhead-view image;

Step 1905: lane line search and fitting is performed on the overhead-view image, to determine lane lines in the overhead-view image; and Step 1906: perspective inverse transformation is performed on the overhead-view image with lane lines being determined, and lane lines of the input images are determined according to a result of the perspective inverse transformation, to obtain the lane detection result of the input image.

In the embodiment of this disclosure, reference may be made to what is described in the first Embodiment for particular implementations of the above steps, which shall not be described herein any further.

It can be seen from the above embodiment that first, preprocessing is performed based on semantic segmentation to remove interference objects in a binary image, which may improve accuracy of the lane detection and may be applicable to various road scenarios, and the result based on semantic segmentation may automatically extract a lane region image containing all the lanes, thereby automatically performing perspective transformation to perform search and fitting on the lanes and achieving multi-lane detection. And furthermore, by synthesizing detection results of a plurality of input images, accuracy and integrity of the lane detection may further be improved.

An embodiment of the present disclosure provides a computer readable program, which, when executed in a lane detection apparatus or an electronic device, will cause a computer to carry out the lane detection method as described in the third Embodiment in the lane detection apparatus or the electronic device.

An embodiment of the present disclosure provides a computer storage medium, including a computer readable program code, which will cause a computer to carry out the lane detection method as described in the third Embodiment in a lane detection apparatus or an electronic device.

The lane detection method carried out in the lane detection apparatus or the electronic device as described with reference to the embodiments of this disclosure may be directly embodied as hardware, software modules executed by a processor, or a combination thereof. For example, one or more functional block diagrams and/or one or more combinations of the functional block diagrams shown in FIGS. 1 and 2 may either correspond to software modules of procedures of a computer program, or correspond to hardware modules. Such software modules may respectively correspond to the steps shown in FIGS. 18 and 19. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIGS. 1 and 2 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIGS. 1 and 2 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

The invention claimed is:

1. An apparatus, comprising:
 a processor to couple to a memory and to,
   detect a plurality of input images to obtain respective lane line detection results indicating one or more lane lines in the input images; and
   obtain a synthetical lane line detection result according to the obtained one or more lane lines in the input images corresponding to the respective lane line detection results,
   wherein to obtain the one or more lane lines of an input image among the input images, the processor is to,
     determine regions of objects of various types in the input image based on a semantic segmentation;

remove interference objects from a binary image of the input image according to the regions of objects of various types in the input image, to obtain a preprocessed binary image;

extract a lane region image from the preprocessed binary image according to the regions of objects of various types in the input image;

perform a perspective transformation on the extracted lane region image to obtain an overhead-view image;

perform a search of one or more lane lines and a fitting on the overhead-view image to determine one or more lane lines in the overhead-view image; and perform a perspective inverse transformation on the overhead-view image with the one or more lane lines in the overhead-view image, to obtain the one or more lane lines in the input image.

2. The apparatus according to claim 1, wherein to obtain the preprocessed binary image, the processor is to:

obtain the binary image of the input image; and remove the interference objects from the binary image according to locations of the interference objects in the regions of objects of various types.

3. The apparatus according to claim 1, wherein to extract the lane region, the processor is to:

extract images of regions where one or more lane lines in the preprocessed binary image are located according to locations of one or more lane lines in the regions of objects of various types; and correct an image among the extracted images to obtain the lane region image.

4. The apparatus according to claim 1, wherein to perform the search and fitting to determine the one or more lane lines in the overhead-view image, the processor is to:

calculate a histogram of accumulated pixel values in the overhead-view image;

determine a number of one or more lane lines in the overhead-view image according to a number of waveforms in the histogram;

search the one or more lane lines in the overhead-view image by using a sliding window, and detect pixels of non-zero values; and fit the detected pixels of non-zero values to determine the one or more lane lines in the overhead-view image.

5. The apparatus according to claim 1, wherein the processor is to:

determine lengths of line segments and/or lengths of intervals between the line segments according to a lane line among the one or more lane lines in the overhead-view image; and determine a type of the lane line according to the lengths of line segments and/or the lengths of intervals between the line segments.

6. The apparatus according to claim 5, wherein the processor is to, determine the type of the lane line as a solid lane line when the lengths of line segments and/or the lengths of intervals between the line segments satisfy any one or combination of conditions including, a ratio of a longest line segment to a shortest line segment in the lane lines being greater than a first threshold;

a length of the longest line segment in the lane lines being less than a second threshold; or an average value of the intervals between the line segments in the lane lines being less than a third threshold; or determine the type of the lane line as a dotted lane line.

7. The apparatus according to claim 1, wherein, the processor is to synthesize the respective lane line detection results of the input images where all detectable number of lane lines are detected in an input image among the input images, to obtain the synthetical lane detection result.

8. The apparatus according to claim 5, wherein, the processor is to determine the type of the lane line according to proportions of types of one or more lane lines respectively determined in overhead-view images corresponding to the input images.

9. An electronic device, comprising the apparatus as claimed in claim 1.

10. A lane detection method, comprising:

by a processor, detecting a plurality of input images to obtain respective lane line detection results indicating one or more lane lines in the input images; and obtaining a synthetical lane line detection result according to the obtained one or more lane lines in the input images corresponding to the respective lane line detection results;

wherein, to obtain the one or more lane lines of an input image among the input images, the processor is to, determining regions of objects of various types in the input image based on a semantic segmentation;

removing interference objects from a binary image of the input image according to the regions of objects of various types in the input image, to obtain a preprocessed binary image;

extracting a lane region image from the preprocessed binary image according to the regions of objects of various types in the input image;

performing a perspective transformation on the extracted lane region image to obtain an overhead-view image;

performing a search of one or more lane lines and a fitting on the overhead-view image, to determine one or more lane lines in the overhead-view image; and performing a perspective inverse transformation on the overhead-view image with the one more lane lines in the overhead-view, to obtain the one ore more lane lines in the input images.

* * * * *